United States Patent [19]

Hultsch et al.

[11] 4,405,454

[45] Sep. 20, 1983

[54] PROCESS AND APPARATUS FOR THE DEWATERING OF SOLIDS IN SUSPENSION

[75] Inventors: Günther Hultsch, Oberschleissheim; Franz Alstetter, Karlsfeld; Uwe Breuer, Grobenzell, all of Fed. Rep. of Germany

[73] Assignee: Krauss-Maffei Aktiengesellschaft, Munich, Fed. Rep. of Germany

[21] Appl. No.: 259,097

[22] Filed: Apr. 30, 1981

[30] Foreign Application Priority Data

May 28, 1980 [DE]  Fed. Rep. of Germany ....... 3020211

[51] Int. Cl.³ .................. B01D 37/00; B04B 3/00
[52] U.S. Cl. .................. 209/279; 209/290; 209/303; 210/369; 210/379
[58] Field of Search .............. 209/270, 279, 280, 290, 209/303, 304; 210/369, 379, 781, 787; 233/2, 27

[56] References Cited

U.S. PATENT DOCUMENTS 2,651,416  9/1953  Van der Mark et al. ....... 210/369 X
4,257,879  3/1981  Bogenschneider et al. ....... 209/17 X

FOREIGN PATENT DOCUMENTS 2165719  7/1973  Fed. Rep. of Germany .
2364260  6/1975  Fed. Rep. of Germany ...... 210/369
2834491  2/1980  Fed. Rep. of Germany .
2930312  2/1981  Fed. Rep. of Germany ...... 210/369

*Primary Examiner*—Ralph J. Hill
*Attorney, Agent, or Firm*—Karl F. Ross; Herbert Dubno

[57] ABSTRACT

A process for the dewatering and particle classification of solids from suspensions, e.g. coal from a slurry in which the coal is transported, makes use of a dewatering centrifuge having two frustoconical centrifuge drum sections of different inclinations such that in a first filtering zone the particles are preliminarily dewatered and then pass by automigration to the next centrifuge drum at which further dewatering takes place. The suspension on the first sieve surface forms a thin layer classification zone having a thickness up to 5 mm and in which the coarse fraction is retained while the fine fraction is passed. The coarse fraction automigrates to the next sieve surface where it is dewatered and the fine fraction separated out in the thin layer classifying zone is then filtered under pressure in a subsequent stage.

4 Claims, 4 Drawing Figures

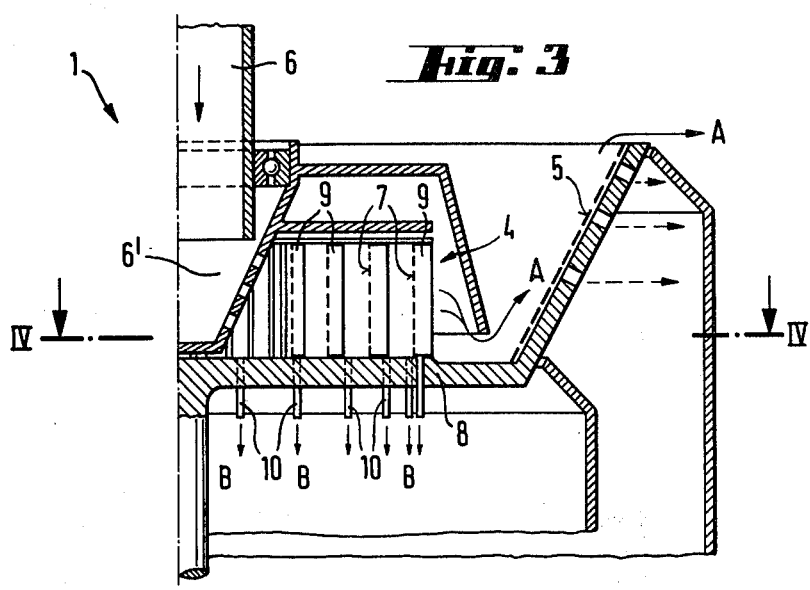
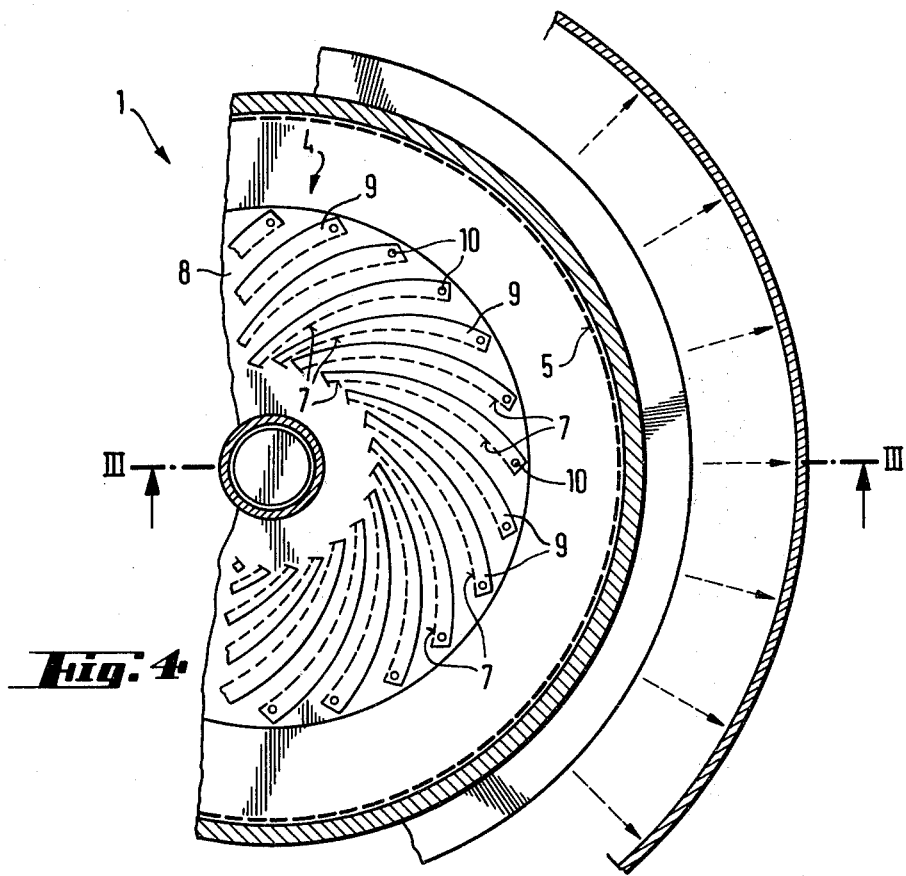

PROCESS AND APPARATUS FOR THE DEWATERING OF SOLIDS IN SUSPENSION

CROSS REFERENCE TO RELATED APPLICATIONS

This application is related to the commonly assigned copending application Ser. No. 229,100 which was copending with and related to Application Ser. No. 64,586 filed Aug. 7, 1979, now U.S. Pat. No. 4,254,904.

FIELD OF THE INVENTION

Our present invention relates to a method of dewatering a suspension or slurry and to an apparatus for carrying out this method. More particularly, the invention deals with the dewatering of solids contained in suspensions or slurries in which these solids are hydraulically transported and in which the solids are in a particle size range of 0.05 mm to 2.0 mm.

BACKGROUND OF THE INVENTION

It is known to provide hydraulic transport systems for carrying particulate matter over long distances in pipe lines or the like, the solids being generally milled to a given particle size range, suspended or slurried in an hydraulic transport medium, generally water, pumped over relatively long distances through troughs, pipelines and the like, and separated at a given destination from the hydraulic transport medium. Thus it is frequently necessary to dewater a slurry or suspension for the hydraulic transport of solids at this destination, thereby freeing the solids from at least the major part of the entraining water.

It is known, in this connection, to carry out the dewatering with concurrent classification of the solids, e.g. separation of the solids into a coarse fraction and a fine fraction with the fine fraction being transferred to a filter stage.

Such systems have been used effectively for the dewatering and classification of coal particles in coal suspension and coal slurry transport technology.

In these systems, an initial stage separates the coarse fraction from the fine fraction by a sieve, whereupon the fine fraction is dewatered in a vacuum filter or decanting centrifuge while the coarse fraction is dewatered in a sieve centrifuge.

Such processes have the disadvantage that sieve machines operate efficiently only with coarse cuts generally in a particle size range of 0.5–2.0 mm. This cut cannot be dewatered with complete satisfaction since the subsequent centrifugal operation is most efficient for a cut in the particle size range of 0.1–0.3 mm where the dewatering is even more effective than can be carried out with filters on particles in this range.

Another disadvantage is that sieve machines, like hydrocyclones, can provide a satisfactory classification effect only in the presence of large quantities of water which may not always be available and which, if added, increase the amount of material which must be handled.

OBJECTS OF THE INVENTION

It is the principal object of the present invention to provide an improved method of classifying and dewatering solids from suspensions and slurries.

Another object of the invention is to provide a method for the purposes described which will eliminate some of the drawbacks of earlier dewatering systems.

Still another object of the invention is to provide an improved method and apparatus of dewatering solids which involves simple equipment, economical operating procedures and minimizes the residual moisture content while avoiding the need to add large quantities of water for classification or other purposes.

SUMMARY OF THE INVENTION

These objects and others which will become apparent hereinafter are attained, in accordance with the present invention, in a method and apparatus for the simultaneous classification and dewatering of a suspension or slurry, especially a solids-transport suspension or slurry containing solids in a particle size range of 0.05 mm to 2 mm and wherein the solids are classified and partially dewatered by centrifugal action on a perforated-drum centrifuge separator to retain a coarse particle size fraction while dewatering the same and passing the fine particle size fraction which can be further dewatered by filtration.

According to this invention, a first inclined sieve surface forming part of a centrifuge drum intercepts the suspension and the retained solids from this surface are transferred to a second sieve surface, generally disposed outwardly of the first surface. The suspension is fed to the first surface and the centrifuge drum is rotated so that on this first surface a thin layer classifying zone is provided in a thickness of up to 5.00 mm, this thin layer classifying zone serving to separate the solids into a coarse fraction A and to effect a preliminary dewatering of this coarse fraction while the fine fraction B is entrained by the water through this zone.

The coarse fraction A, after preliminary dewatering, is transferred, i.e. by automigration, under the centrifugal force applied to the layer on the inclined drum surface, to the second perforated drum portion which advantageously has a smaller inclination and thus serves for classical dewatering. The component B entrained through the thin layer classification zone is then subjected to dewatering in a filter stage.

The system described has the advantage that, in the thin layer classification zone, there is a separation of the particles by particle size so that the particle size range which is retained and transferred to the second centrifugal dewatering zone can be optimally dewatered by the centrifugal action. On the other hand, the fine particle fraction which impedes effective centrifugal dewatering is discharged from the first surface so that it does not interfere with the dewatering on the second surface and also can be efficiently dewatered by filter action without creating an extraordinarily large volume of solids which must be filtered. The optimum particle size cuts for filtering and centrifugal dewatering are thus separated even from suspensions and slurries having a high solids content.

Advantageously, the classification in the thin classification zone is effected with the cut at 0.1 to 0.3 mm such that the coarse fraction can contain particles as small as 0.1 mm while all smaller particles pass through and are subjected to filtration. This can be achieved with a centrifugal acceleration of 3,000 to 10,00 m/sec.$^2$. The filtration in the fine-fraction filtration stage is advantageously effected by pressure filtration with a positive pressure gradient across the filter in the direction of filtration between 1.0 and 6.0 bar, i.e. with application of a pressure of this level to the suspension of the fine fraction applied to the filter while the downstream side of the filter is at ambient pressure.

An important advantage of the present invention is that the classification and the dewatering of the coarse fraction are effected in a single apparatus and hence the capital expenditure for equipment, the spatial requirements and the process complexity are all reduced. The system also allows a particle size cut of 0.1 to 0.3 mm in particle size to be classified and retained in the centrifuge where it can be dewatered significantly more intensively and effectively than in filters.

Preferably, the sieve surfaces for effecting the centrifugal classification and dewatering are frustoconical surfaces which widen or diverge toward their discharge edges, the second surface being positioned to intercept the solids discharged from the first surface.

The first surface has an angle of inclination (conicity half angle) selected with respect to the friction angle of the solids on the surface to provide the desired thin layer classification zone and also intended to permit continuous movement of this zone outwardly so that the solids are discharged onto the second surface. The second surface has a reduced conicity angle for increased dewatering and solids retention time. Thus, the solids transit across the surface of the inner drum portion relatively rapidly and only much more slowly across the outer drum portion from which they are discharged.

The thin layer classification zone can, of course, also be formed on the various other drum surfaces which are possible in accordance with the prior application, for example, and German patent documents Nos. 21 65 719 and 28 34 491. Thus the inner sieve surfaces can be those of a pocket centrifuge, for example.

BRIEF DESCRIPTION OF THE DRAWING

The above and other objects, features and advantages of the present invention will become more readily apparent from the following description, reference being made to the accompanying drawing in which:

FIG. 3 is a schematic, fragmentary section (generally along line III—III of FIG. ) showing the application of the principles of this invention to a pocket centrifuge; and FIG. 4 is a cross section taken along the line IV—IV of FIG. 3.

SPECIFIC DESCRIPTION

Figure 1:
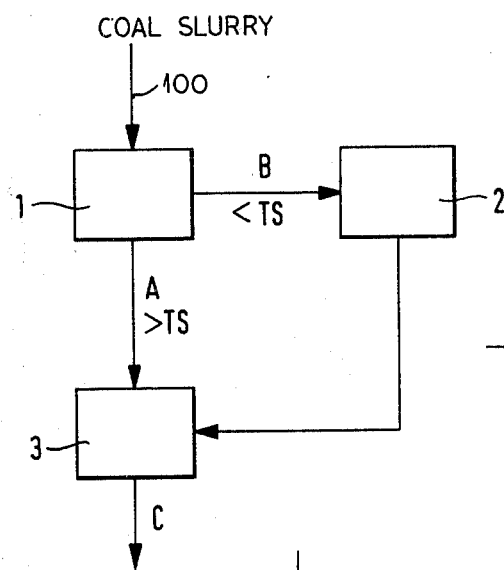
FIG. 1 is a block diagram illustrating the principles of the present invention.

As can be seen from FIG. 1, a slurry or suspension, e.g. of coal, is delivered by a pipeline 100 to a dewatering station, the solids having a particle size in the range of 0.05 mm to 2.0 mm.

At the dewatering station, the solids are partially dewatered and classified in a sieve-type centrifuge (FIGS. 2 through 4) thereby separating the particles into a coarse fraction A and a fine fraction B, cut between the two fractions being taken somewhere in the range of 0.1 mm and 0.3 mm, preferably at about 0.1 mm.

In the first stage 1, corresponding to classification, the coarse fraction of the slurry is also partly dewatered while the fine fraction, entrained, by the liquid phase passes at B to the pressure filtering stage 2 at which it is dewatered. The particle size at which the classification between the two fractions is considered to occur is represented at TS so that the coarse fraction A contains particles of the size more than TS while the fine fraction B contains particles of a size less than TS.

The dewatered fractions, after coarse particles have been further dewatered on the second surface of the centrifuge, are then combined at a mixing station 3 and the solids are recovered at C with a low moisture content.

Figure 2:
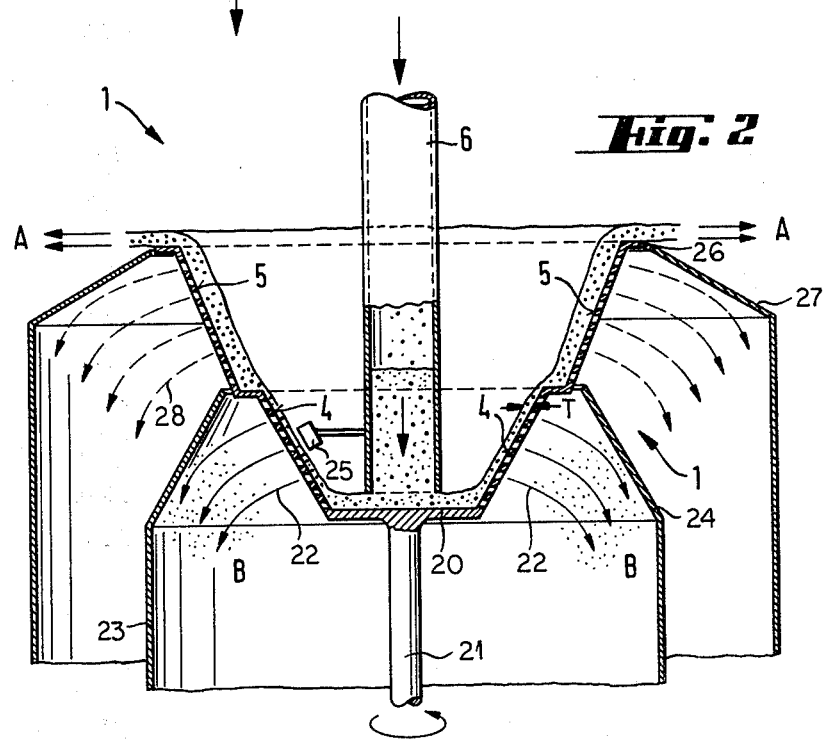
FIG. 2 is a diagrammatic axial cross sectional view of a simplified classifying and dewatering centrifuge for the first stage of the process of the present invention.

FIG. 2 shows the sieve centrifuge which can be used, in accordance with the present invention, to carry out the separation in stage 1. The centrifuge has a centifuge drum with a first or inner perforated upwardly diverging frustoconical surface 4 whose inclination to the axial direction is greater than that of the outer perforated surface 5. Both of these drum surfaces are frustoconical and hence the half angle of the first surface 4 is greater than that of the second surface 5.

The drum comprises a bottom wall 20 which is mounted on a shaft 21 driven at an appropriate rate for centrifugal separation of water from the slurry which is fed to the bottom of the drum by a pipe 6 terminating just above the bottom wall 20 so that the slurry can spread out and centrifugally migrate up the perforated surface 4.

The inclination of the surface 4 with respect to the fraction angle of the solids is established such that a thin continuously migrating filter cake is rapidly established, thereby forming the thin classification zone mentioned above with the particle fraction B being entrained by the water through the perforations in the surface 4 as represented by the arrows 22 and being collected in a duct 23 having a shield 24 reaching inwardly close to the top of the perforated surface 4.

The thickness T of the layer along the surface 4 should not exceed 5.0 mm.

This thickness can be monitored by a sensor 25 on the pipe 6, e.g. in the form of an ultrasonic transducer measuring the proximity of the solids to the sensor, the sensor 25 controlling the speed of the motor driving the shaft 21 but not further illustrated. This speed and the thin classification layer ensure a separation of the particle size fractions A and B at a particle size TS in the range of 0.1 mm to 0.3 mm, thereby ensuring that the coarse fraction A will be optimally dewatered in the centrifuge.

The coarse fraction A migrates upwardly onto the surface 5, because of its smaller angle of inclination, allows the layer to build to a substantially greater thickness as shown so that the solids have a greater retention time on the surface 6 than on the surface 4. The dewatered solids of the fraction A pass over the lip 26 of the drum and outwardly of a shield 27 into which the water from the layer on surface 5 can pass as represented by arrows 28.

The intensive dewatering on the surface is effected with centrifugal acceleration of 3,000 to 10,000 m/sec.$^2$.

In the embodiment of FIGS. 3 and 4 as well, the surfaces 7 are inclined to the radial direction at angles such that thin classification layers of the filter cake are formed thereon before the solids pass onto the surface 5 on which the residence time of the solids is greater.

The operation of the pockets of this centrifuge will be found in greater detail from the U.S. Pat. No. 4,245,904 which is hereby included in its entirety by reference.

The feed pipe 6 opens into a distributor 6' which spreads the suspension within the drum and permits it to encounter the surfaces 7 as the suspension is centrifugally cast out outwardly.

The coarse fraction thus is transferred to the surface 5 while the fine fraction B together with water, passes through the perforations of the surfaces 7 into the pockets 9 and is discharged from the pockets by tubes 10.

It is also possible to carry out the process of the invention in a pusher type centrifuge as described in commonly assigned copending application Ser. No. 127,115 filed March 4, 1980 (hereby included by reference) using cylindrical centrifuge drum but provided with a frustoconical drum head of the cylindrical drum to form the thin layer classification zone.

We claim:

1. In an apparatus for dewatering a slurry containing solids in a particle size range of 0.05 mm to 2.0 mm and in which the solids are classified into a fine fraction and a coarse fraction, the fine fraction is filtered, and the coarse fraction is dewatered, the improvement which comprises:
   a centrifuge drum formed with at least one first sieve surface inclined so as to enable a thin-layer classification zone of solids to form thereon in a thickness of about 5 mm, and a second sieve surface outwardly of said first sieve surface and receiving said coarse fraction therefrom;
   means for maintaining said layer at said thickness on said first sieve surface;
   means for feeding said slurry onto said first surface whereby particles of said fine fraction pass through perforations in said first surface thereby classifying the solids into said coarse and fine fractions; and
   means for separately collecting said fine fraction and water from said first surface, water passing through perforations in said second surface, and the coarse fraction following dewatering on said second surface.

2. The improvement defined in claim 1 wherein said first and second surfaces are formed as frustoconical sieve surfaces constituting a centrifuge drum, said second surface having a small end disposed at the large end of said first surface so as to receive said coarse fraction therefrom, said first surface having a greater half angle than said second surface.

3. The improvement defined in claim 4 wherein said first surface is formed by a plurality of curved perforated surfaces mounted upon a circular array of pockets on a rotor, each of said pockets having an outlet for said fine fraction and being positioned to cast said coarse fraction onto said second surface, said second surface being a frustoconical surface disposed outwardly of said pockets on said rotor.

4. The improvement defined in claim 1 wherein said feeding means includes a pipe connected to a pipeline for the hydraulic displacement of coal in suspension.

* * * * *